United States Patent
Church

(10) Patent No.: US 12,241,447 B2
(45) Date of Patent: *Mar. 4, 2025

(54) FLUID TURBINE SYSTEM AND METHOD OF USE

(71) Applicant: Tap Energy LLC, Erie, CO (US)

(72) Inventor: Coty Church, Erie, CO (US)

(73) Assignee: Tap Energy LLC, Erie, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/380,005

(22) Filed: Oct. 13, 2023

(65) Prior Publication Data

US 2024/0044311 A1 Feb. 8, 2024

Related U.S. Application Data

(63) Continuation of application No. 17/897,140, filed on Aug. 27, 2022, now Pat. No. 11,788,502.

(60) Provisional application No. 63/240,815, filed on Sep. 3, 2021.

(51) Int. Cl.
F03B 5/00 (2006.01)

(52) U.S. Cl.
CPC ............ *F03B 5/00* (2013.01); *F05B 2220/32* (2013.01); *F05B 2220/7062* (2013.01); *F05B 2240/24* (2013.01)

(58) Field of Classification Search
CPC .............................. F03B 5/00; F05B 2220/32; F05B 2220/7062; F05B 2240/24; F05B 2220/7066; F05B 2240/60; F05B 2260/404; Y02B 10/50; Y02E 10/20

See application file for complete search history.

(56) References Cited

U.S. PATENT DOCUMENTS

| | | | |
|---|---|---|---|
| 1,061,142 | A | 5/1913 | Tesla |
| 4,268,385 | A | 5/1981 | Yoshikawa |
| 6,885,114 | B2 | 4/2005 | Baarman |
| 8,152,142 | B2 | 4/2012 | Hirakui |
| 2005/0180845 | A1 | 8/2005 | Vreeke |
| 2009/0146431 | A1 | 6/2009 | Onodera |
| 2011/0027069 | A1 | 2/2011 | da Silva Couto |
| 2012/0007368 | A1 | 1/2012 | Silva Valente |
| 2012/0207588 | A1 | 8/2012 | Schmidt |

(Continued)

FOREIGN PATENT DOCUMENTS

| | | |
|---|---|---|
| JP | H08 121101 | 5/1996 |
| WO | WO 2012/004127 | 1/2012 |
| WO | WO 2018/047018 | 3/2018 |

OTHER PUBLICATIONS

International Searching Authority, International Search Report and Written Opinion mailed Dec. 6, 2022 in PCT/US 2022/041781.

(Continued)

*Primary Examiner* — Joseph Ortega
(74) *Attorney, Agent, or Firm* — Critical Path IP Law, LLC

(57) ABSTRACT

Systems and methods for generating electricity from a fluid turbine are provided. In one aspect, the system employs a Tesla turbine to rotate a drive shaft, the drive shaft providing torque to operate an electrical generator. The incoming fluid flow that operates the Tesla turbine enters a hollow portion of the drive shaft and exists the system as an exhaust flow. The system may operate from standard water supplies provided to a residence or business, thereby reclaiming excess water pressure energy.

20 Claims, 9 Drawing Sheets

(56) References Cited

U.S. PATENT DOCUMENTS

2013/0043681 A1    2/2013  Rivera
2016/0003047 A1    1/2016  Jeute
2017/0205108 A1*  7/2017  Petrovic .................. F01D 15/10

OTHER PUBLICATIONS

Office Action in U.S. Appl. No. 17/897,140 mailed May 4, 2023.
Notice of Allowance in U.S. Appl. No. 17/897,140 mailed Aug. 30, 2023.
Extended European Search Report, European Patent Office, dated Oct. 7, 2024, in EP 22865346.5.

* cited by examiner

FLUID TURBINE SYSTEM AND METHOD OF USE

CROSS-REFERENCE TO RELATED APPLICATION

This application is a continuation of U.S. patent application Ser. No. 17/897,140 titled "Hydroelectric Turbine System and Method of Use" filed Aug. 27, 2022 and claims the benefit of U.S. Provisional Patent Application No. 63/240,815 titled "Hydroelectric Turbine System and Method of Use" filed Sep. 3, 2021, the disclosures of both are hereby incorporated herein by reference in entirety for all purposes.

FIELD

The disclosure relates generally to systems and methods involving a fluid turbine, and specifically to systems and methods for generating electricity from a fluid turbine.

BACKGROUND

Traditional incoming water sources to homes or businesses operate at higher water pressures than required to ensure robust and standardized water delivery. The excess water pressure equates to wasted energy.

What is needed is a system or method to collect a portion of the excess water pressure for other purposes without compromising water delivery service, thereby recovering what would otherwise be wasted energy. The disclosure solves this need. Specifically, a portion of the excess water pressure may be used to generate electricity. As such, an otherwise wasted source of energy (the excess water pressure) is used to generate electricity.

SUMMARY

A fluid turbine system is disclosed which is connected to an incoming water source of a home, business or other conventional or standard water supply source. The system produces small amounts of electricity every time a homeowner consumes water (i.e., drinking, bathing, watering lawn, laundry, etc.). In one embodiment, the fluid turbine system may be used as a replacement or supplement to a pressure reducing valve in a home or business. In another embodiment, the system may be installed in-line with an existing pressure reducing valve. The excess water pressure provides the energy needed to drive a turbine that is coupled to a generator which in turn produces electricity.

In one embodiment, a hydroelectric turbine system is disclosed, the system comprising: a body configured to receive an inlet fluid supply, the body having a longitudinal axis; a set of turbine blade discs disposed within the body and in fluid communication with the inlet fluid supply; a turbine shaft axially mounted along the longitudinal axis and coupled to the set of turbine blade discs, the turbine shaft having a hollow turbine shaft portion; a shaft coupler axially mounted along the longitudinal axis and coupled to the turbine shaft; an electrical generator coupled to the shaft coupler; wherein: the inlet fluid supply imparts a disc torque to the set of turbine blade discs and flows into the hollow turbine shaft portion; the turbine shaft receives the disc torque urging the turbine shaft to rotate along the longitudinal axis; the shaft coupler rotates about the longitudinal axis to yield a rotating shaft coupler; the electrical generator generates electricity as enabled by the rotating shaft coupler; and the inlet flow enters the hollow turbine shaft portion and forms an exhaust fluid stream.

In one aspect, each turbine blade disc of the set of turbine blade discs comprises a set of bosses disposed on a respective disc surface. In another aspect, the inlet fluid supply is provided by a water utility water supply. In another aspect, the electrical generator is a DC generator, and the electricity includes DC electricity. In another aspect, the system further comprises a system controller operating to control at least one of an inlet fluid supply pressure and an inlet fluid supply flow rate. In another aspect, the body comprises a body chamber configured to direct the inlet fluid supply to substantially flow tangentially along a disc surface of each turbine blade disc. In another aspect, the shaft coupler is a magnetic shaft coupler; and the shaft coupler is magnetically coupled to the turbine shaft.

In another embodiment, a method of generating electricity from a hydroelectric turbine device is disclosed, the method comprising: providing a hydroelectric turbine device comprising: a body configured to receive an inlet fluid supply, the body having a longitudinal axis; a set of turbine blade discs disposed within the body and in fluid communication with the inlet fluid supply; a turbine shaft axially mounted along the longitudinal axis and coupled to the set of turbine blade discs, the turbine shaft having a turbine shaft interior; a shaft coupler axially mounted along the longitudinal axis and coupled to the turbine shaft; and an electrical generator coupled to the shaft coupler; supplying the inlet fluid supply to the body; directing the inlet fluid supply to flow along a disc surface of each turbine blade disc of the set of turbine blade discs; generating a disc torque from the set of turbine blade discs; flowing the inlet fluid into the turbine shaft interior and out from the turbine shaft interior to form an exhaust fluid stream; receiving, by the turbine shaft, the disc torque; rotating the turbine shaft as urged by the disc torque; receiving, by the shaft coupler, the disc torque to generate a coupler torque; and generating electricity by the electrical generator as enabled by the coupler torque.

In one aspect, the shaft coupler is a magnetic shaft coupler; and the shaft coupler is magnetically coupled to the turbine shaft. In another aspect, each turbine blade disc of the set of turbine blade discs comprises a set of bosses disposed on a respective disc surface. In another aspect, the inlet fluid supply is provided by a water utility water supply. In another aspect, the electrical generator is a DC generator, and the electricity includes DC electricity. In another aspect, the method further comprises a system controller operating to control at least one of an inlet fluid supply pressure and an inlet fluid supply flow rate.

In yet another embodiment, a hydroelectric turbine device to generate electricity is disclosed, the device comprising: body having a longitudinal axis and configured to receive an inlet fluid stream; a plurality of turbine blade discs positioned within the body, each turbine blade disc: i) having a turbine blade disc surface oriented substantially parallel to the inlet fluid stream as the inlet fluid stream flows over the turbine blade disc surface to generate a disc torque, and ii) configured to rotate about the longitudinal axis; a perforated turbine shaft positioned to rotate about the longitudinal axis, the plurality of turbine blade discs axially positioned concentrically about the perforated turbine shaft and rotating with a perforated turbine shaft rotation; a shaft coupler in communication with the perforated turbine shaft, the shaft coupler configured to rotate about the longitudinal axis as urged by the perforated turbine shaft rotation; and an electrical generator coupled to the shaft coupler; wherein: the shaft coupler generates a shaft coupler torque upon the perforated turbine shaft rotation; and the electrical generator generates electricity as enabled by the shaft coupler torque.

In one aspect, the inlet fluid stream enters a perforated turbine shaft hollow portion through one or more apertures of the perforated turbine shaft to form a perforated turbine shaft fluid stream. In another aspect, the perforated turbine shaft fluid stream exits the perforated turbine shaft hollow portion to form an exhaust fluid stream. In another aspect, the shaft coupler is a magnetic shaft coupler; and the shaft coupler is magnetically coupled to the perforated turbine shaft. In another aspect, the inlet fluid supply is provided by a water utility water supply. In another aspect, the electrical generator is a DC generator, and the electricity includes DC electricity. In another aspect, the system further comprises a system controller operating to control at least one of an inlet fluid supply pressure and an inlet fluid supply flow rate.

The word "app" or "application" means a software program that runs as or is hosted by a computer, typically on a portable computer, and includes a software program that accesses web-based tools, APIs and/or data.

The phrase "cloud computing" or the word "cloud" refers to computing services performed by shared pools of computer resources, often over the Internet.

The phrase "user interface" or "UI", and the phrase "graphical user interface" or "GUI", means a computer-based display that allows interaction with a user with aid of images or graphics.

By way of providing additional background, context, and to further satisfy the written description requirements of 35 U.S.C. § 112, the following references are incorporated by reference in their entireties: U.S. Pat. Appl. Nos. 2013/0043681 to Rivera; 2017/0205108 to Petrovic; 2011/0027069 to da Silva Couto; and 2012/0207588 to Schmidt; U.S. Pat. No. 4,268,385 to Yoshikawa and U.S. Pat. No. 8,152,142 to Hirakui; and WIPO WO2012/004127 to Finke.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine," "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Various embodiments or portions of methods of manufacture may also or alternatively be implemented partially in software and/or firmware, e.g., analysis of signs. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. FIGS. 4-6 are scaled drawings. Identical reference numerals have been used, where possible, to designate identical features that are common to the figures.

FIG. 6 is a section view of another embodiment of the disclosed hydroelectric turbine system.

Figure 1:
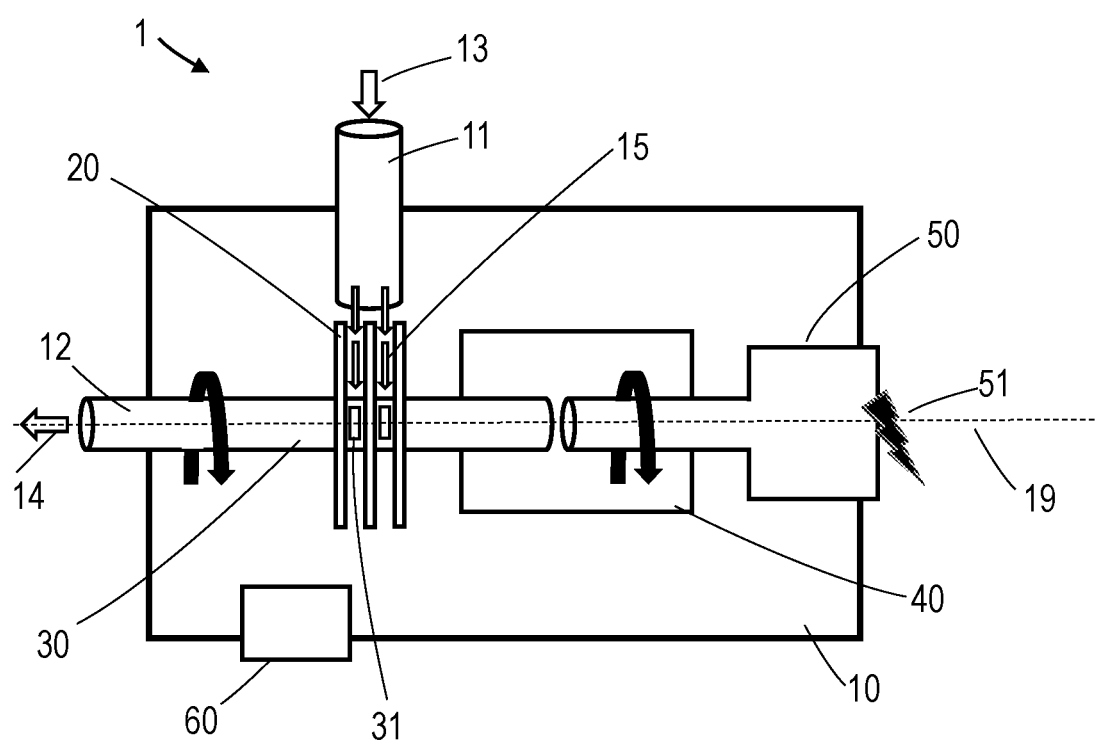
FIG. 1 is a schematic diagram of one embodiment of a hydroelectric turbine system of the disclosure.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments. The following descriptions are not intended to limit the embodiments to one preferred embodiment. To the contrary, it is intended to cover alternatives, modifications, and equivalents as can be included within the spirit and scope of the described embodiments as defined, for example, by the appended claims.

The disclosed devices, systems, and methods of use will be described with reference to FIGS. 1-6. Generally, systems and methods for generating electricity from a fluid turbine or hydroelectric turbine are disclosed.

In one embodiment, the turbine design is a Tesla turbine based upon Nikola Tesla's boundary layer turbine principle. The turbine blades are relatively thin, smooth discs, properly spaced apart, coupled to a hollow shaft and provide the torque needed to rotate a generator. This bladeless design allows for ease of manufacture and simplicity in design. The turbine blade assembly (i.e., discs coupled to a hollow drive shaft) is connected to a magnetic shaft coupler. This eliminates the need to use high friction shaft seals for shafts protruding from the casement. Ultimately, this helps, among other things, to increase efficiency of the turbine.

The driveshaft (aka turbine shaft) is designed to be hollow because of the nature of the fluid flow inside the turbine. (Note that the driveshaft is, typically and in many embodiments, not a uniformly or completely hollow "tube" but rather partially hollow, as detailed below in more detailed descriptions, e.g., see FIG. 4E. In one embodiment, the driveshaft has a hollow portion). Fluid enters tangent (or near tangent or substantially tangent) to the outermost diameter of one or more turbine discs (aka one or more turbine discs). This fluid path then begins to spiral inward toward the center of a disc (the rotation and mounting point of the disc). Eventually the fluid reaches the driveshaft (with a hollow center portion) and ports through the outer diameter (through, e.g., one or more apertures) and continues into the hollow, inner diameter of the shaft. Fluid generally or substantially enters tangent to the rotating member of the turbine and exits perpendicular through the center of the assembly. Stated another way, the fluid flows parallel over a disc surface. To generate power, a DC generator is coupled magnetically to the driveshaft of the turbine. Power produced from the generator may then be transferred to an inverter for use as AC current in a household or stored in a battery bank (or similar) for use at a later time.

The term "tangent" means touching, but not intersecting, a surface.

The term "substantially" means to a great or significant extent, and at least 90% or more of the qualified term; e.g., the phrase "substantially tangent" means 90% or more at a tangent. The phrase "Tesla turbine" means any bladeless centripetal flow turbine, to include that patented by Nikola Tesla in circa 1913 and also turbines described as boundary-layer turbines, cohesion-type turbines, Prandtl-layer turbines, and any turbine that uses the boundary-layer effect and not a fluid impinging upon the blades as in a conventional turbine.

The term "fluid" means a substance devoid of shape and yields to external pressure, to include liquids (such as water) and gases.

Note that although the disclosure in some embodiments refers to water as the fluid in the disclosed system and method, other fluids may be used, to include hydrocarbons such as oil, steam, air, contaminated water (containing dissolved solids).

Figure 3:
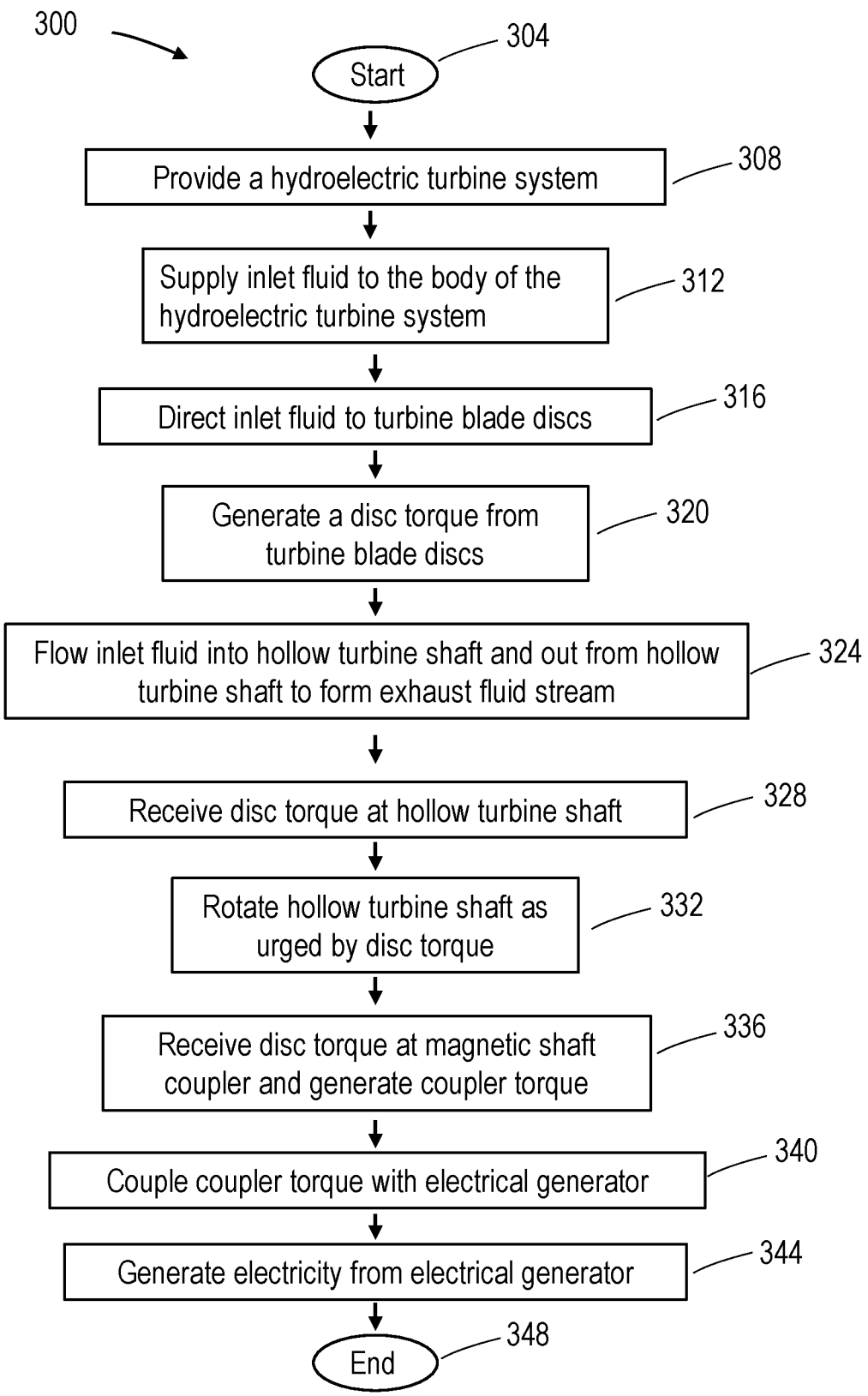
FIG. 3 is flow diagram of one method of using a hydroelectric turbine system of the disclosure, such as the hydroelectric turbine system described in FIGS. 1, 2, 4 and 5.

FIG. 1 presents a generalized schematic diagram of one embodiment of a hydroelectric turbine system 1 of the disclosure. The hydroelectric turbine system may be referred to as "hydroelectric system," "hydroelectric turbine system," "hydroelectric turbine device," "turbine system," and/or simply "system" or "device" in the disclosure. FIG. 3 presents a flow diagram of one method 300 of using a hydroelectric turbine system 1 of the disclosure. The method 300 of using the hydroelectric turbine system may be referred to as the "system method" and/or simply as the method."

The hydroelectric turbine system 1 comprises a body 10, a set of turbine blade discs 20, a hollow turbine shaft 30, a magnetic shaft coupler 40, an electrical generator 50, and a system controller 60.

The body 10 is configured to receive an inlet fluid supply 13 through an inlet port 11 and output an exhaust fluid stream 14 through an exhaust port 12. Thus, the system may be deemed a continuous flow system because it provides for a continuous flow of fluid, from inlet port 11 through body 10 (and several other system components, e.g., along disc surfaces and into the hollow turbine shaft) and out through exhaust port 12. The inlet fluid supply 13 may be a residential, business, or any conventional or commercial fluid supply. The inlet fluid supply 13 may first be regulated, e.g., reduced in pressure, prior to flowing into inlet port 11. (See FIGS. 2A-B for example configurations of installing or integrating the hydroelectric turbine system with inlet fluid supplies). The body 10 has a longitudinal axis 19, which forms an axis of symmetry for one or more components of the hydroelectric turbine system 1.

Note that the input fluid supply may be any available water source. Typically, in a residential or business installation of the hydroelectric turbine system, the water supply is provided by a water utility, a water well, or a water storage tank. The inlet fluid supply 13, as supplied and described as step 312 of FIG. 3, flows into the inlet port 11. The inlet port 11, as described at step 316 of FIG. 3, directs the inlet water fluid supply 13 to the set of turbine blade discs 20. More specifically, the inlet fluid supply 13 flows to or toward the set of turbine blade discs 20 to create a tangential disc flow 15. Stated another way, the inlet fluid supply 13 is directed to produce an inlet fluid stream (tangential disc flow 15) that runs or flows along the surface of the set of turbine blade discs 20. The tangential disc flow 15 generates a disc torque (utilizing the Tesla turbine principle), as described in step 320 of FIG. 3, and the set of turbine blade discs 20 rotate.

The set of turbine blade discs 20 are attached or coupled to the hollow turbine shaft 30. Each of the set of turbine blade discs 20 and the hollow turbine shaft 30 are disposed or coupled to the body longitudinal axis 19 to present an axial symmetry. Stated another way, the set of turbine blades 20 are axially positioned concentrically about the turbine shaft 30. The hollow turbine shaft 30 receives the disc torque, as described at step 328 of FIG. 3, and rotates about the longitudinal axis 19, as enabled by the disc torque, as described at step 332 of FIG. 3.

The hollow turbine shaft 30 (also referred to as "turbine shaft" or "drive shaft") is at least partially hollow to allow water (or other fluid) to flow through a central axis of the turbine shaft 30 and out of the turbine perpendicular to the incoming flow. The periphery of the shaft is perforated to allow water to enter into the hollow section. As such the hollow turbine shaft 30 may also be referred to as a "perforated turbine shaft." The perforations of the turbine shaft may be slots, round holes or other configurations and are keyed to mate with one or more discs. The turbine shaft is coupled to a magnetic shaft coupler but may also be coupled directly to a DC generator shaft. In other embodiments, the shaft may be coupled to a gearbox to increase the RPM ratio of drive shaft to DC generator shaft where torque permits.

The tangential disc flow 15, after passing or flowing over one or more of the exterior surfaces of one or more of the turbine blade discs 20 of the set of turbine blade discs 20, flows into one or more turbine shaft ports 31 of the hollow turbine shaft 30 (aka apertures of the turbine shaft or apertures of the perforated turbine shaft) and exits the hollow turbine shaft 30 at the exhaust port 12 to form an exhaust fluid stream 14, as described at step 324 of FIG. 3.

A disc torque is created or produced or generated as the inlet fluid supply or inlet fluid stream passes over the surfaces of the discs 20. (The term "torque" means a twisting force that tends to cause rotation). This disc torque causes or urges the turbine shaft 30 to rotate about the longitudinal axis 19, thus yielding a rotating turbine shaft.

The disc torque is transferred, by way of the magnetic shaft coupler 40, to a coupler torque, the coupler torque in turn urging rotation of the magnetic shaft coupler 40. The magnetic shaft coupler 40 allows or enables non-contact torque coupling or transfer (via a magnetic field), thus avoiding heat and wear issues of traditional mechanical torque transfer devices. Stated another way, the rotating hollow turbine shaft 30 generates a coupler torque at the magnetic shaft coupler 40, as described at step 336 of FIG. 3. The coupler torque is coupled to or with the electrical generator 50. Stated another way, the coupler torque is transferred or provided to, by way of the magnetic shaft coupler 40, the electrical generator 50 at step 340. (Note that in some embodiments, the magnetic shaft coupler 40 is another type of coupler other than a magnetic shaft coupler, such as a conventional mechanical coupler or other coupler known to those skilled in the art). The electrical generator 50, as enabled by the coupler torque and as described at step 344 of FIG. 3, generates electricity 51.

The electrical generator 50 may be a DC generator and may be coupled to a charge controller to regulate amperage and voltage going into a battery bank to prevent overcharging and damage to a battery bank. In lieu of a charge controller, the system may contain a blocking diode to prevent current from flowing in reverse.

In some embodiments, the electrical generator 50 may contain monitoring and control for uses such as leak detection (or this may be done in concert by or solely by system controller 60). For example, if constant (input or inlet fluid) flow at a given rate is detected over a specified time duration, the device may contain overrides to automatically shut fluid (e.g., water) off to prevent damage to the site (e.g., the home, business, etc.). A monitor may also include a flow meter to measure flow through the device. In one embodiment, system communication is provided to auxiliary devices such as a computer or smartphone for visibility of system status, flow details, power output, etc.

The system controller 60 may perform any number of functions to control the operation of the hydroelectric turbine system 1. For example, the controller 60 may regulate or control the electricity 51 output by control of the inlet fluid supply 13, or vice versa. The controller 60 may regulate or control or operate the inlet fluid supply pressure and/or inlet fluid supply flow rate.

The system controller 60 may be operated by a user through a hydroelectric turbine system app and/or may interact with other apps or controllers associated with aspects of fluid (e.g., water) or other control of energy features of the site of installation of the hydroelectric turbine system. For example, a user may use the hydroelectric turbine system app to control or operate the system controller 60 to control operation of the hydroelectric turbine system, such controlled operation influenced by fluid (e.g., water) pressure(s) throughout the installation site of the hydroelectric turbine system or a monitored energy usage of the installation site.

The system controller 60, alone or in coordination with a system processor or a hydroelectric turbine system app, may monitor and/or record hydroelectric turbine system operations or performance, such as energy savings per day or per week through use of the hydroelectric turbine system. The system controller 60 may, in some embodiments, record system operational parameters (e.g., water pressures, times of use of the hydroelectric turbine system, etc.) on a database, such database a physical database and/or a cloud-based database.

Figure 2A:
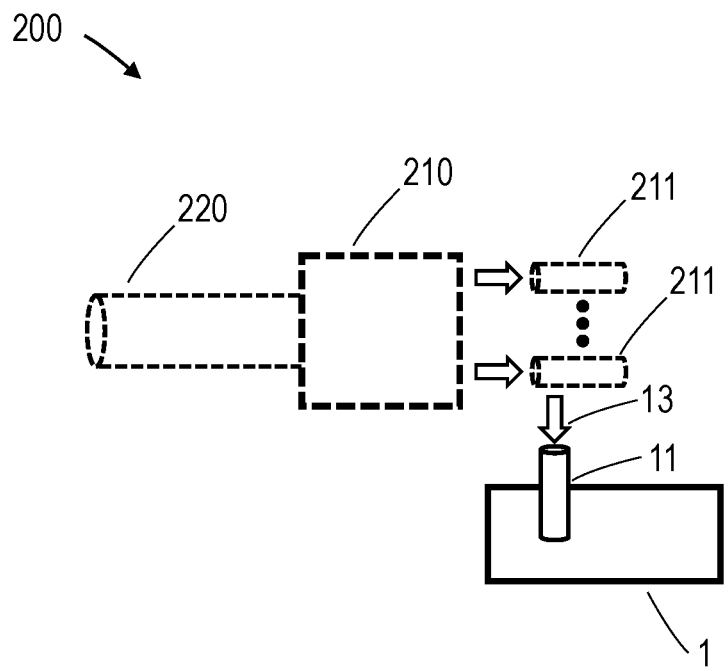
FIG. 2A is a schematic diagram of one embodiment of integrating a hydroelectric turbine system of the disclosure with a residential water supply.
Figure 2B:
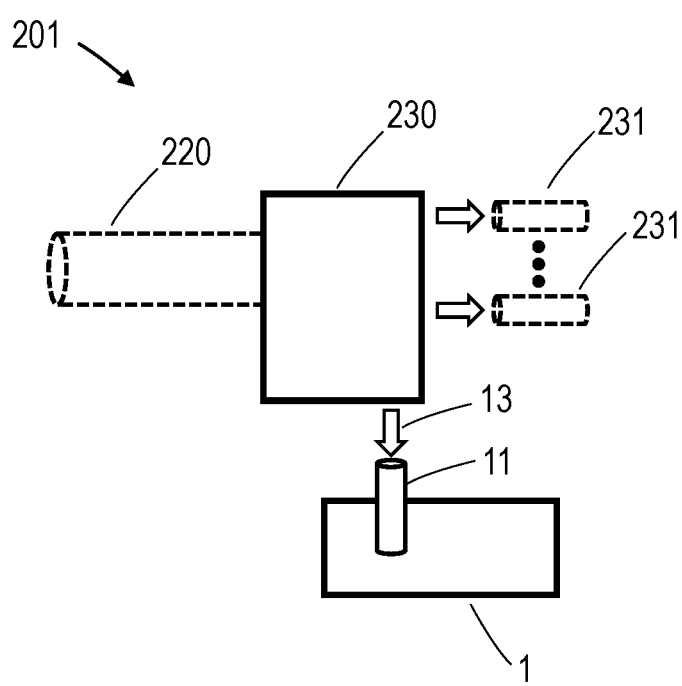
FIG. 2B is a schematic diagram of another embodiment of integrating a hydroelectric turbine system of the disclosure with a residential water supply.

The hydroelectric turbine system 1 may be engaged in any number of ways with a main or master water supply, such as supplied to a residence or business. FIGS. 2A-B describe two example configurations: a first configuration 200 and a second configuration 201.

In the first configuration 200 of FIG. 2A, a main or master water supply 220 feeds or is received by a conventional or existing pressure reduction valve 210. The pressure reduction valve 210 provides water to any number of conventional water systems 211, such as a toilet, a faucet, etc. The hydroelectric turbine system 1 may operate or integrate with one of these conventional water systems 211 such that a portion of the incoming water volume or pressure (inlet fluid supply 13) is supplied to the hydroelectric turbine system 1, wherein the water pressure portion (inlet fluid supply 13) feeds an inlet port 11 of the hydroelectric turbine system 1 as described above with respect to FIGS. 1 and 3. In a similar embodiment to that of FIG. 2A, the hydroelectric turbine system 1 may receive a water pressure or volume directly from the pressure reduction valve 210.

In the second configuration 201 of FIG. 2B, a main or master water supply 220 feeds or is received by a water pressure reduction valve 230, which in turn delivers water to one or more conventional water systems 231 as well as to a hydroelectric turbine system 1 by way of an inlet port 11. In a similar embodiment to that of FIG. 2B, the hydroelectric turbine system 1 may receive a water pressure or volume directly from the water pressure reduction valve 230. The water pressure reduction valve 230 may comprise unique or specialized features to connect or couple or engage with the inlet port 11 of hydroelectric turbine system 1, such as mechanical and/or electrically controlled plumbing to connect to the inlet port 11 and/or operate or control the inlet port 11.

Other configurations of integrating the hydroelectric turbine system of the disclosure with a main or master water supply 230 are possible, to include fitting the hydroelectric turbine system with a specialized water reduction value that replaces and/or augments a conventional or existing pressure reduction valve 210 such as that of FIG. 2A or that replaces and/or augments a specialized water pressure reduction valve 230 such as that of FIG. 2B. Note that the aforementioned specialized water reduction value may operate or function as a throttling value that influences or controls the pressure entering or received by the hydroelectric turbine system. Such specialized water reduction value(s) may be controlled by a system controller, such as the system controller 60 described above with respect to FIG. 1.

Stated another way, the hydroelectric turbine system may be used in conjunction with a PRV (pressure reducing valve) or completely bypassing a PRV altogether. Pressure drops are inherent in the hydroelectric turbine system and will result in a drop in pressure and kinetic energy of the water is lost to heat generation from friction within the hydroelectric turbine system. The hydroelectric turbine system design provides small pressure losses and may be used in series where incoming pressure is high enough to support multiple devices inline.

The flow diagram of FIG. 3 presents one method 300 of using a hydroelectric turbine system of the disclosure, such as the hydroelectric turbine system and/or components described in FIGS. 1, 2, 4 and 5. Generally, the method 300 of FIG. 3 starts at step 304 and ends at step 348. Any of the steps, functions, and operations discussed herein can be performed continuously and automatically. In some embodiments, one or more of the steps of the method of use 300, to include steps of the method 300, may comprise computer control, use of computer processors, and/or some level of automation (to include, for example, the system controller 60 of FIG. 1). The steps are notionally followed in increasing numerical sequence, although, in some embodiments, some steps may be omitted, some steps added, and the steps may follow other than increasing numerical order.

Some of the steps may involve a user, which may be a single user or a set of users that coordinate requirements that are provided to the hydroelectric turbine system. For example, a user may operate a valve at step 312 as to the inlet fluid supply 13 so as to vary the input flow rate (e.g., from shut-off to a maximum rate). A user may interact or perform one or more of the described steps by using a display/GUI and/or an app, a smartphone or other portable electronic device, and/or a desktop electronic device. The user may interact with the controller 60, directly or wirelessly. For example, the user may operate the controller 60 so as to regulate or control or operate the inlet fluid supply pressure and/or flow rate, as described above, or any other set of states or configurations of the hydroelectric turbine system and/or components or elements of the hydroelectric turbine system.

The controller 60 may operate with or include or comprise a computer processor and/or a database, the database a physical server and/or a cloud-based system. The database may store and/or process historical data concerning the operation of the hydroelectric turbine system, such as electricity generated with time or as a function of inlet or main water supply flows. The controller 60 may produce data concerning the operation of the system, such as electricity generated over time.

The steps of the method 300 of FIG. 3 have been generally described above and therefore are only briefly described here.

The method 300 begins at step 304. After completing step 304, the method 300 proceeds to step 308.

At step 308, a hydroelectric turbine system, such as that described in FIGS. 1, 2, and 4-6, is provided. After completing step 308, the method 300 proceeds to step 312.

At step 312, an inlet fluid supply is provided or input to, or received by, the body the hydroelectric turbine system. The inlet fluid supply may be provided, for example, in the manners described in FIGS. 2A and 2B. The inlet fluid supply may be controlled by a system controller and/or by a system user, to include remotely by a user. After completing step 312, the method 300 proceeds to step 316.

At step 316, the inlet fluid supply is directed to the set of turbine blade discs. More specifically, the inlet fluid supply is directed to flow generally or substantially over the surfaces of one or more of the turbine blade discs, so as to for, a tangential flow over the disc surfaces. After completing step 316, the method 300 proceeds to step 320.

At step 320, the tangential flow of the inlet fluid supply over the one or more turbine blade discs generates or creates or produces a disc torque. After completing step 320, the method 300 proceeds to step 324.

At step 324, the inlet fluid supply, after passing over the one or more turbine blades, is received by or flows into the one or more apertures of the hollow turbine shaft (or perforated turbine shaft). The fluid received by the turbine shaft then reorients or turns approximately 90 degrees (i.e., turns perpendicular to the received flow direction) and flows along the inside of the turbine shaft to form an exhaust fluid stream. After completing step 324, the method 300 proceeds to step 328.

At step 328, the disc torque produced or generated or created at step 320 is received at the turbine shaft (the turbine shaft being coupled or connected to the set of disc blades). After completing step 328, the method 300 proceeds to step 332.

At step 332, the turbine shaft rotates as urged by the disc torque received at step 328. After completing step 332, the method 300 proceeds to step 336.

At step 336, the magnetic shaft coupler receives the disc torque to produce or generate a coupler torque. After completing step 336, the method 300 proceeds to step 340.

At step 340, the coupler torque is coupled to or received by the electrical generator. After completing step 340, the method 300 proceeds to step 344.

At step 344, the electrical generator generates electricity as enabled by the received coupler torque. After completing step 344, the method 300 proceeds to step 348 and ends.

FIGS. 4 and 5 present a particular embodiment of the hydroelectric turbine system and/or components of the hydroelectric turbine system.

Figure 4A:
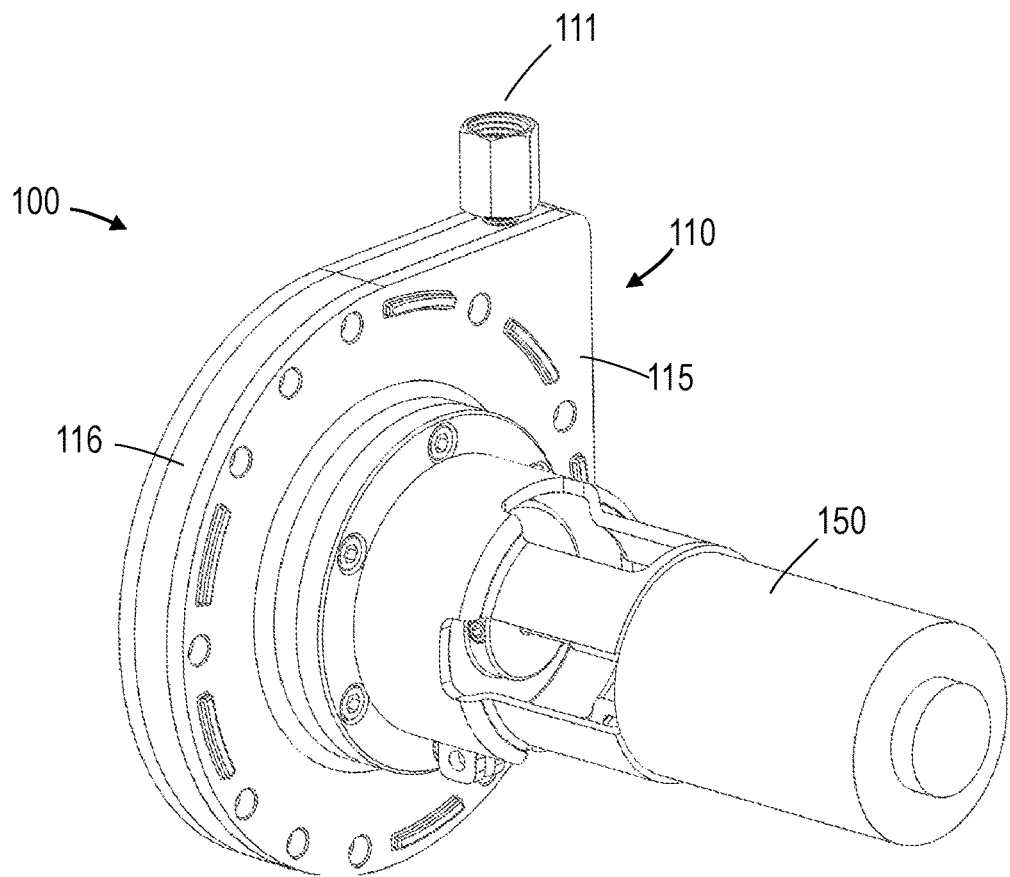
FIG. 4A is an isometric view of another embodiment of a hydroelectric turbine system of the disclosure.
Figure 4B:
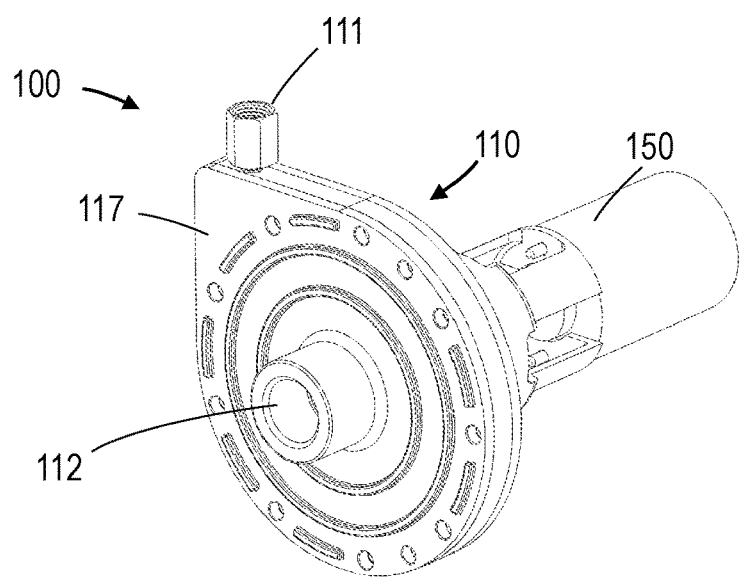
FIG. 4B is another isometric view of the embodiment of a hydroelectric turbine system of FIG. 4A.
Figure 4C:
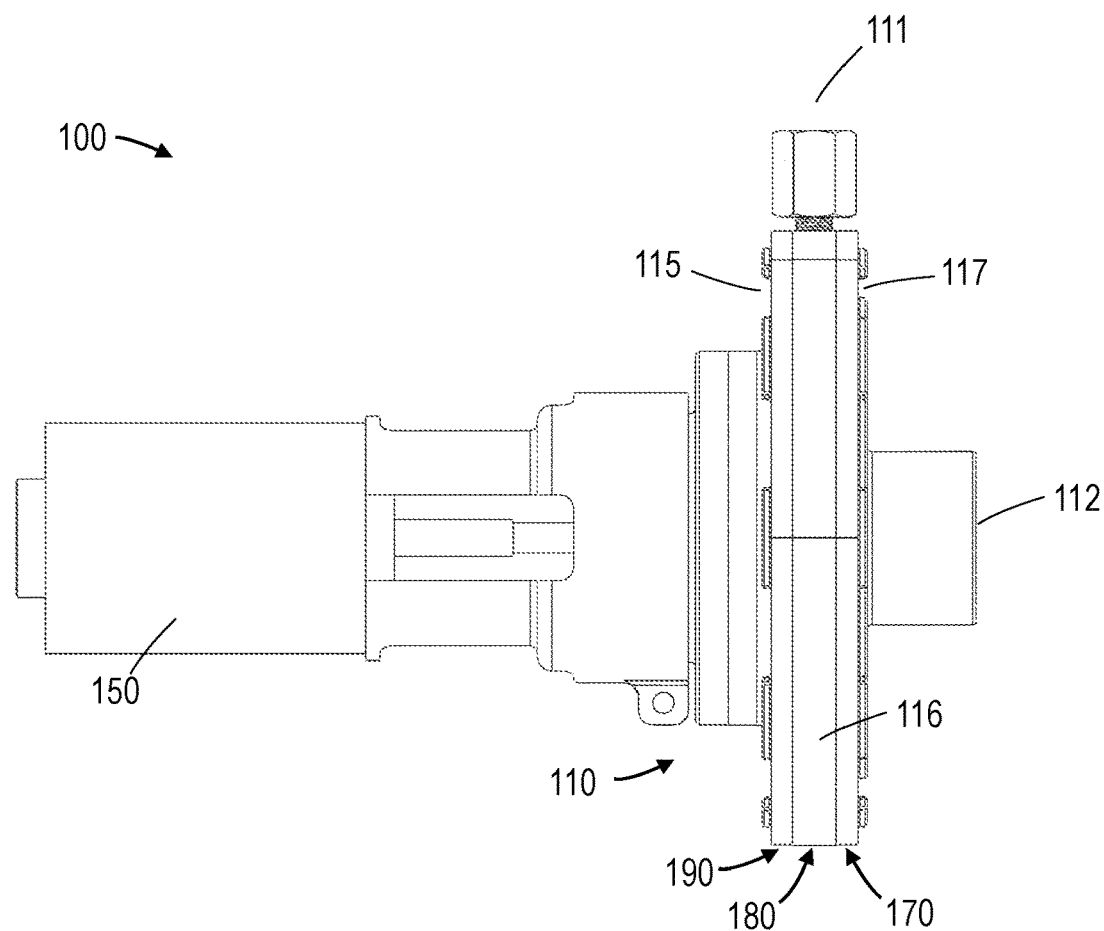
FIG. 4C is a side view of the embodiment of a hydroelectric turbine system of FIG. 4A.

FIGS. 4A-B present isometric views of the hydroelectric turbine system 100. FIG. 4C presents a side view and FIG. 4D an end view of the hydroelectric turbine system 100. FIG. 4E presents a sectional side view of the hydroelectric turbine system 100.

With attention to FIGS. 4A-E, the hydroelectric turbine system 100 comprises a body 110, the body comprising a first exterior surface 115 facing away from the exhaust port 112, a second exterior surface 117 facing in parallel with the exhaust port 112, and a thickness 116. The body 110 comprises an inlet port 111 which receives an inlet fluid supply. The inlet fluid supply flows into the body and out from the body through exhaust port 112. The exhaust port 112, and the electrical generator 150, are disposed or positioned along the longitudinal axis of the hydroelectric turbine system 100.

The hollow turbine shaft 130 receives a disc torque from the attached set of turbine blade discs, resulting in rotation of the hollow turbine shaft 130 about the longitudinal axis. The rotating hollow turbine shaft engages the magnetic shaft coupler 140, which in turn transfers torque (dubbed a coupler torque) to the electrical generator 150. The electrical generator is symmetrically mounted along the longitudinal axis of the hydroelectric turbine system by way of a generator mount 151. The generator mount 151 is also symmetrically mounted along the longitudinal axis of the hydroelectric turbine system.

A set of turbine blade discs 120 (in this embodiment, the turbine blades are three in number, creating a set of four voids either between the set of three discs or on the outside of an exterior or outside disc) are disposed symmetrically about the hollow turbine shaft 130. The hollow turbine shaft 130 comprises one or more turbine shaft ports (or apertures) 131. The inlet fluid supply generally enters the inlet port 11, flows tangentially over one or more exterior surfaces of one or more of the set of turbine blade discs 120, enters one or more of the turbine shaft ports 131 of the hollow turbine shaft 130, and flows out through the exhaust port 112 to form an exhaust fluid stream.

The hydroelectric turbine system 100 also comprises a pair of outer ring grooves 195, an inner ring groove 196, and a pair of low friction ball bearings 197, such as low friction glass ball bearings.

With attention to FIG. 4C from left to right, an electrical generator 150 is coupled to an independent generator mount 151. This mount 151 may be fastened to turbine via clamping (as designed and shown here) or any other means of attachment such as threaded fasteners. This mount 151 clamps on the magnetic coupler housing and by nature of the clamping mount, allows for spacing adjustment of the coupler affixed to the generator shaft in relation to the coupler located inside the turbine for maximum torque transmission. Next, the housing for the magnetic coupler 140 is attached to the exhaust shell directly by threaded fasteners on the face. This could also be any other means of fastening one element to another. The next piece to the right is the generator shell, then the turbine chamber and finally the exhaust shell.

An exhaust shell 170, a chamber 180, and a generator shell 190 form a sideways stacked arrangement that contains the set of turbine discs 120. The exhaust shell 170 forms the exhaust port 112 and comprises second exterior surface 117. The exhaust shell 170 forms part of the body 110 of the hydroelectric turbine system 100. The chamber 180 comprises the tangential inlet port 181 as feed from inlet port 111. The chamber 180 forms part of the body 110 of the hydroelectric turbine system 100. The generator shell 190 forms part of the body 110 of the hydroelectric turbine system 100 and comprises first exterior surface 115. The generator shell 190 comprises O-ring grooves to form a sealed interface with the coupler housing and chamber.

Figure 4D:
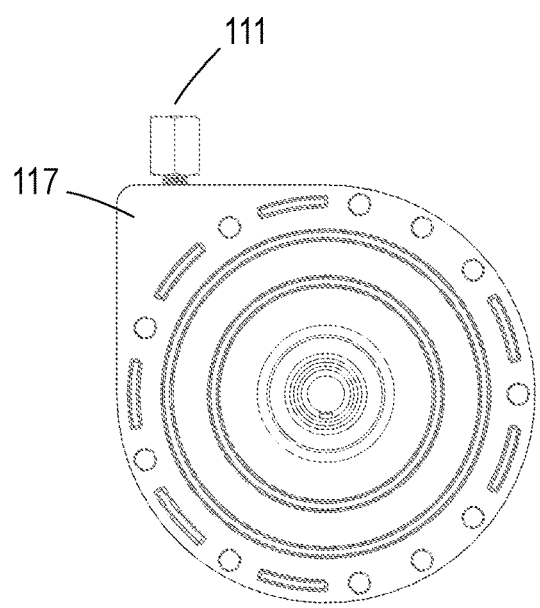
FIG. 4D is an exhaust port side view of the embodiment of a hydroelectric turbine system of FIG. 4A.
Figure 4E:
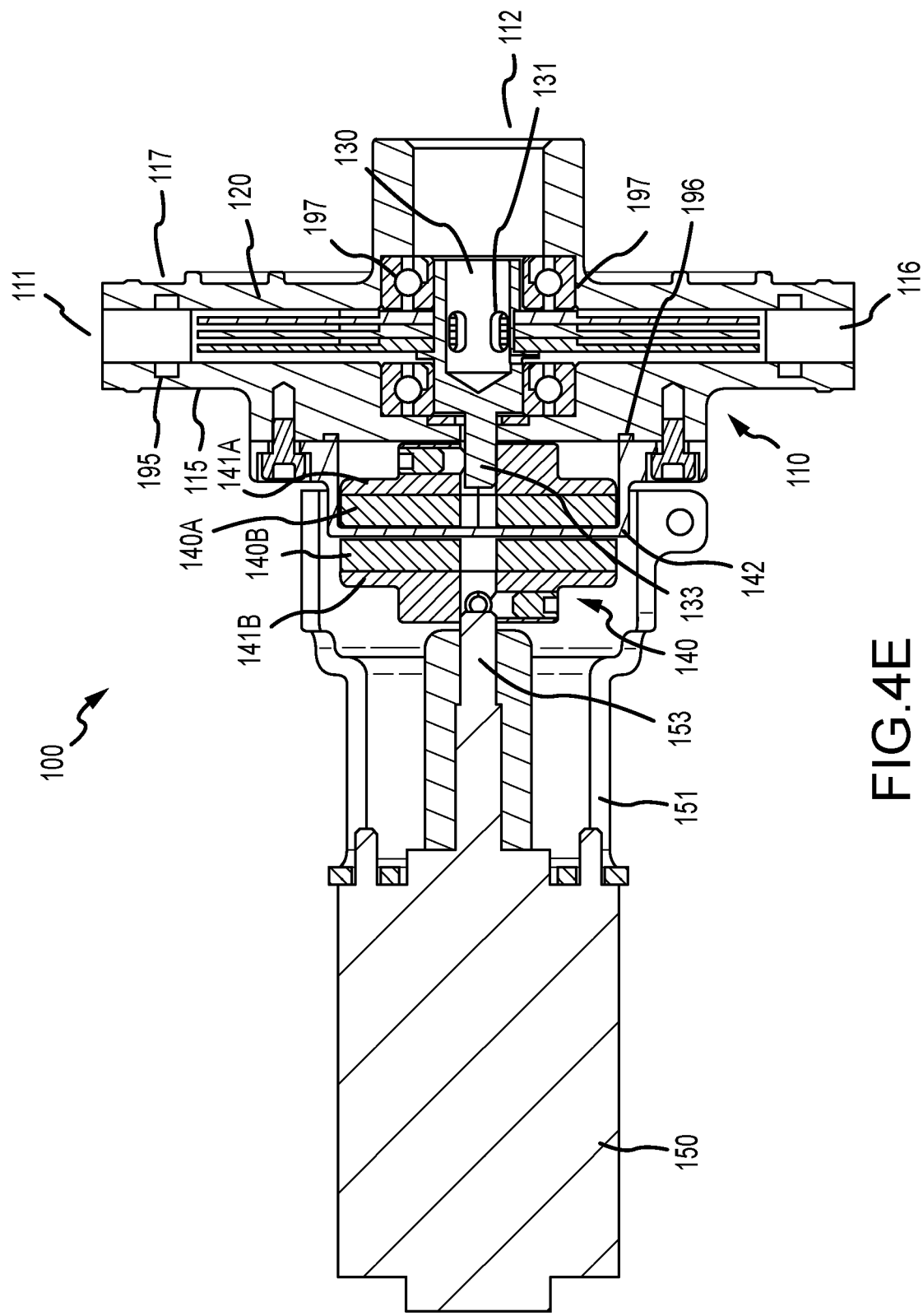
FIG. 4E is a sectioned view of the embodiment of a hydroelectric turbine system of FIG. 4A.

With attention to FIG. 4D (an exhaust port side view of the hydroelectric turbine system 100), the exhaust may contain internal or external threads (pipe threads) to connect to customer's or user's utility piping. This embodiment depicts one inlet 111. Through holes are provided for mounting bolts to clamp entire system together, while employing strategically placed dowel pins to prevent incorrect assembly and to provide alignment of all exterior components.

With attention to FIG. 4E, the coupler housing is sealed via an O-ring against the generator shell. The generator shell contains provisions for a thrust bearing to prevent friction build up should the disc pack shift laterally along the drive shaft axis. The generator shell also contains provisions for a ball bearing. This portion and the exhaust portion both contain water sealing features in the form of O-ring grooves to prevent leakage during use. This seal could be in the form of labyrinth seals (multi-groove, sealant such as RTV, gasketing, etc.) or any combination of sealing methods listed or known to those skilled in the art. The exhaust shell also contains provisions for a ball bearing seat. This saddle mount bearing setup ensures that the turbine runs true under high RPM and reduces drag within the system to obtain higher efficiencies.

The magnetic shaft coupler 140 comprises a first magnetic plate 140A, a first magnetic plate mount 141A, a second magnetic plate 140B, and a second magnetic plate mount 141B, all symmetrical about a common longitudinal axis. The first magnetic plate 140A is coupled to or connected with the first magnetic plate mount 141A, both symmetrical about a longitudinal axis (e.g., about longitudinal axis 19, as depicted in FIG. 1). The second magnetic plate 140B is coupled to or connected with the second magnetic plate mount 141B, both symmetrical about a longitudinal axis (e.g., about longitudinal axis 19, as depicted in FIG. 1). The first magnetic plate 140A magnetically communicates with the second magnetic plate 140B such that a rotation of the first magnetic plate 140A induces or urges a rotation of the second magnetic plate 140B.

The hollow turbine shaft 130 is coupled to or connected with hollow tube shaft extension 133, which in turn is coupled to or connected with first magnetic plate 140A and/or first magnetic plate mount 141A. As the hollow tube shaft extension 133 rotates or turns, the first magnetic plate 140A and the first magnetic plate mount 141A rotate or turn.

The electrical generator 150 comprises electrical generator shaft 153. The electrical generator shaft 153 is coupled to or connected with the second magnetic plate 140B and the second magnetic plate mount 141B. As the second magnetic plate 140B and the second magnetic plate mount 141B rotate or turn, the electrical generator shaft 153 rotates or turns. The rotating electrical generator shaft 153 is used by the electrical generator 150 to generate electricity. For example, the electrical generator 150 may be fitted with electrical wires and leads and the electrical generator shaft 153 may be fitted with a set of magnets, such that the rotation of the set of magnets induces an electrical current in the wires of the electrical generator 150 to generate electricity.

A first portion (aka the drive portion) of the magnetic shaft coupler 140 is covered with or sealed by coupler drive portion cover 142. The coupler drive portion cover 142 seals off fluid that may leak through the aperture formed to allow a pass though of the hollow tube shaft extension 133. Note that the use of a magnetic coupler between the (drive) hollow turbine shaft 130 (driven by the rotation of the set of turbine discs 120) and the electrical generator shaft 153 provides many benefits, to include the ability to (fluidly) seal the portion of the system interacting with fluid (to include, e.g., the hollow turbine shaft 130 and the set of turbine discs 120) from the electrical generator 150, and the ability to operate such a rotational power transfer in the presence of misalignment of the two rotating shafts (i.e., the hollow turbine shaft 130 and the electrical generator shaft 153.

In one embodiment, the relative rotational speed (RPM) of the hollow turbine shaft 130 and the electrical generator shaft 153 is regulated by way of a controller, such as system controller 60 of FIG. 1. In one embodiment, the absolute rotational speed (RPM) of the hollow turbine shaft 130 and/or the electrical generator shaft 153 is regulated by way of a controller, such as system controller 60 of FIG. 1.

In some embodiments, the hollow turbine shaft 130 may not be a fully or complete hollow shaft, but rather may be hollow for only a portion or part of the turbine shaft. Stated another way, the hollow turbine shaft 130 is sufficiently hollow to enable fluid flow from the blade disks to the exhaust port 12 to form the exhaust fluid stream 14. In contrast, the portion of the hollow turbine shaft 130 opposite the exhaust port is not hollow but instead solid.

FIGS. 5A-D detail the disc/shaft assembly 160 portion of the hydroelectric turbine system 100 as a set of views depicting additional features. The disc/shaft assembly 160 fits within body 110 (as shown in FIG. 4E) and comprises the set of turbine blade discs 160 and the (at least partially) hollow turbine shaft 130 with turbine shaft keyed portion 132. Also depicted are a set of four curved bosses 121 (depicted in FIGS. 5C-D) that are mounted or disposed on an exterior surface of each adjacent side of each of the set of turbine blade discs 120.

In some embodiments, the turbine shaft ports 131 are formed around the outside diameter of the (at least partially) hollow drive shaft 130; these ports allow fluid (such as water) to spiral inward toward the drive shaft 130 to enter the semi-hollow shaft 130 and exit the turbine. The ports 131 also contain an integrated retaining ring for a bearing to locate against. Such an integrated retaining ring may also be formed by cutting a groove in the shaft and adding a retaining ring or other common retaining methods, as known to those skilled in the art. Note that although the boundary layer principle of the Tesla turbine does not require anything to direct fluid flow, the addition of the bosses 121 add multiple features. One such feature is that of design simplification. The turbine discs need to be separated to allow the fluid to apply torque to cause rotation. Typically, this would be done by the use of additional discs of a smaller diameter or by using washers to gap the discs. The bosses in this embodiment act as those spacers but also have a curved or semi-circular shape to additionally allow an impulse on the discs. These bosses may be formed as part of the whole disc (machined, cast, forged, mold or any other means known to those skilled in the art). The bosses may also be independently formed and attached by mechanical fastening, welding, gluing or other means known to those skilled in the art. A plurality of directional bosses may exist on the surface of the disc, arranged radially around the central axis. The design of FIGS. 5C-D contains four bosses, but other numbers and designs are possible. Bosses may also be used as modifiable weights to balance each disc. Balancing (similar to balancing a tire with wheel weights) is necessary due to potentially high rotational speeds, i.e., high rotations per minute (RPM). It should be noted that one of the bosses is unique and contains a feature that acts as a shaft key to lock the discs in proper alignment to the drive shaft. In the embodiment shown, the feature is rectangular in shape (thus mimicking the shape of a shaft key) but may be of any other shape or design, as known to those skilled in the art.

Figure 5A:
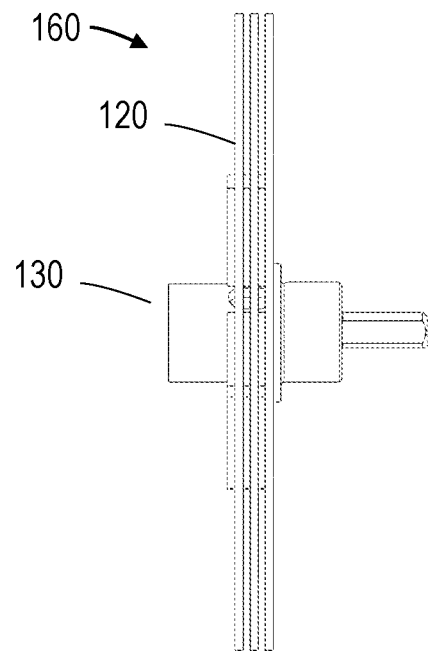
FIG. 5A is a side view of another embodiment of the set of turbine blade discs mounted to the hollow turbine shaft of the hydroelectric turbine system of FIG. 4A.
Figure 5B:
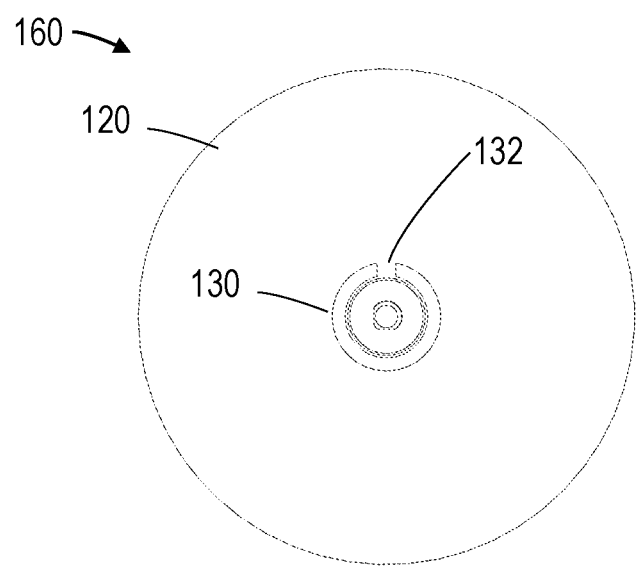
FIG. 5B is a sectioned view of FIG. 5A.
Figure 5C:
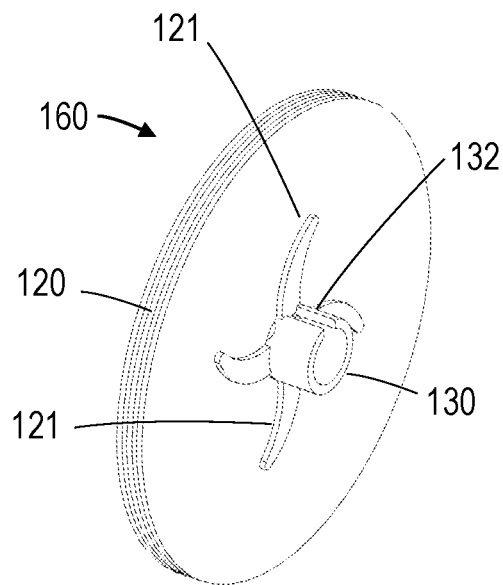
FIG. 5C is an isometric view of FIG. 5A with the exhaust side shown facing out.
Figure 5D:
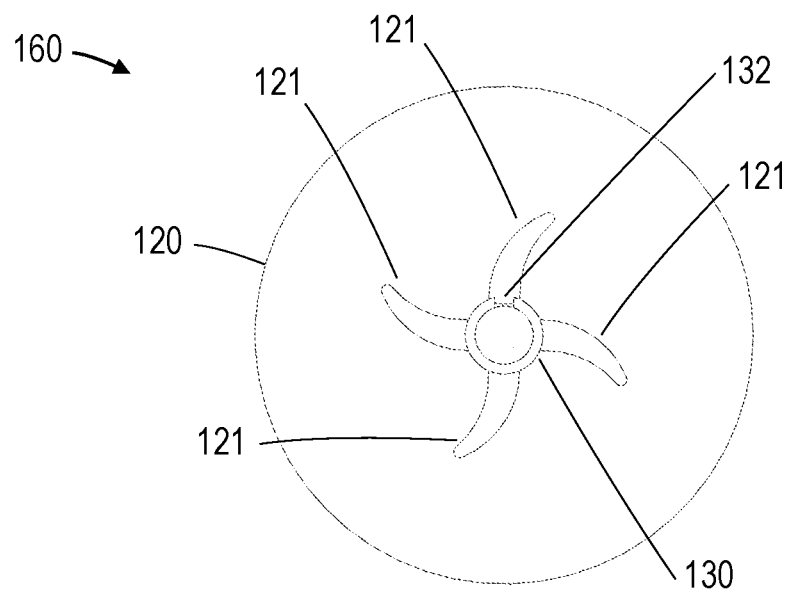
FIG. 5D is a front view of FIG. 5A.

With attention to FIG. 5B, note the shaft contains two flats for attaching to and driving the magnetic shaft coupler. With attention to FIG. 5D, note the keyed nature of the drive shaft and hollow section of the drive shaft that allows the water to flow out of. The flats are designed for the current embodiment and may change if mounting a different style coupler requires.

In some embodiments, one or more turbine blade discs 120 may form a single boundary layer turbine disc with one or more integrated channeling bosses. In such an embodiment, an integrated shaft key feature may be formed wherein the base or root of one of the curved bosses connects through a keyed feature with the turbine shaft keyed portion 132.

In one embodiment, one or more turbine blade discs 120 may include a set of disc bosses that are attached independently (and/or are detachable) as opposed to being molded, machined, cast, etc.

Note that in the design presented in FIGS. 4-5 is relatively small and contains three discs that are 4.0" in diameter. However, this disc size may be scaled up or down in diameter as well as in quantity to meet the needs of a particular or specific application. Along with the scaling of the disc size, the inlet and outlet ports and generator may also be scaled in size to meet the application. For example, in a residential home the typical copper pipe coming into the home is ¾". The generator requires a specified RPM of the turbine to output a given power. Thus, the inlet size is reduced to increase the velocity of the water flow prior to entering the turbine to provide the proper RPM.

Also, note that the design presented in FIGS. 4-5 is based upon the Tesla turbine but may be of other known turbine blade/disc designs that employ fins or cups to catch water or any design thought of hereafter. The design shown in the supporting images has four curved bosses that help to guide the water flow toward the center of the shaft. These bosses also provide the proper spacing between discs at assembly. One of the four bosses is keyed to the shaft to provide a positive, no-slip drive. These bosses may be incorporated into the blade as one whole unit (disc with bosses machined into the disc) or be independently attached to each disc (flat disc with bosses attached via screws, pins, welding or any other means of permanently affixing).

In some embodiments, the hydroelectric turbine system may contain a non-permanent nozzle for customization of power output by varying incoming water pressure via flow. The nozzle may be adjustable, as in an adjustable valve and controlled manually or automatically based on system monitoring to regulate outgoing flow.

In some embodiments, the hydroelectric turbine system may be powered and run in reverse to pump fluid in opposite direction as that used to create power. In some embodiments, the hydroelectric turbine system may contain multiple inlets around a perimeter of a set of discs.

In some embodiments, the driveshaft of the hydroelectric turbine system may or may not protrude through the exterior of the turbine casement; it may, for example, be directly coupled to a DC generator by means of a mechanical shaft coupler.

Figure 6:
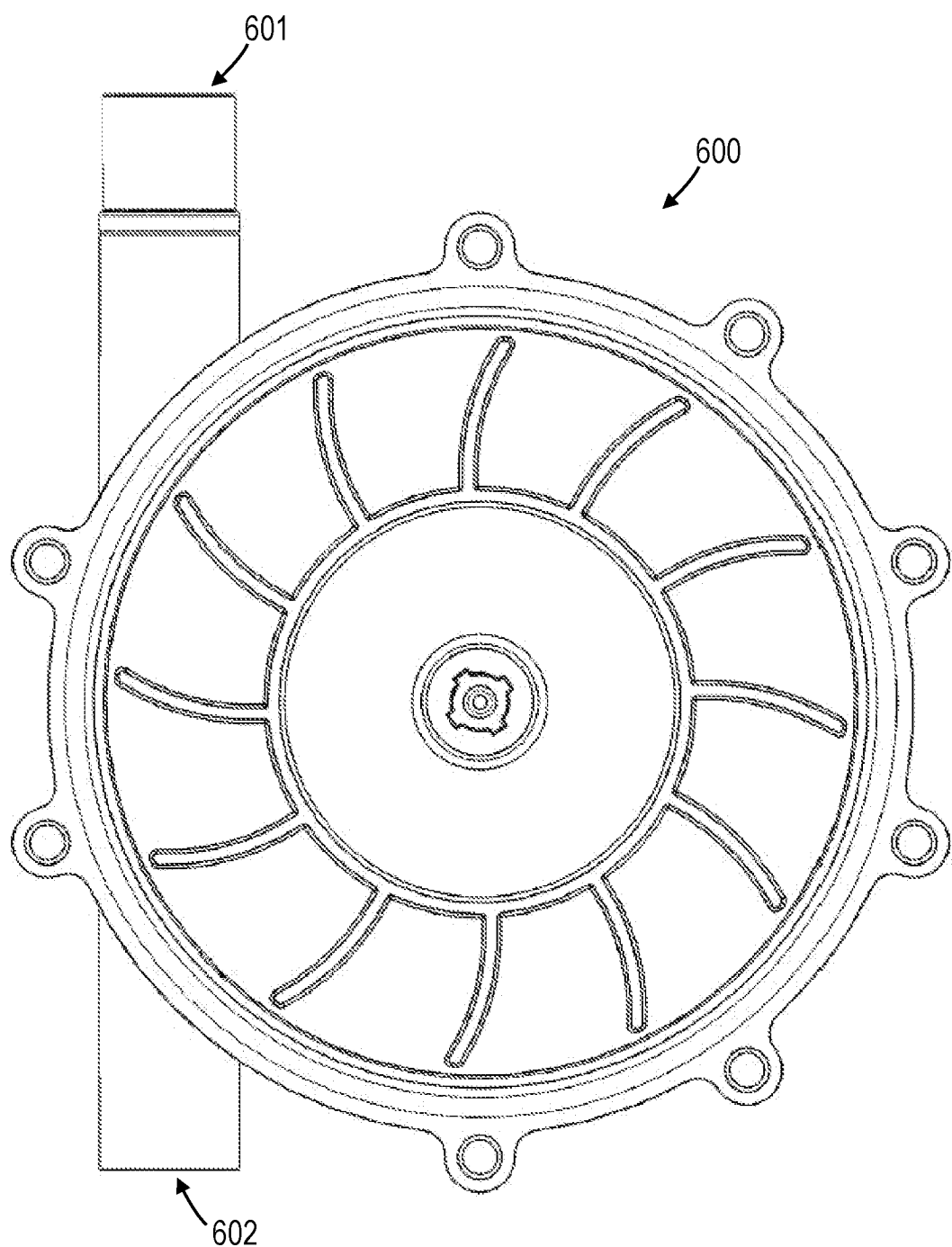

FIG. 6 depicts an alternate embodiment of a hydroelectric turbine system 600. The hydroelectric turbine system 600 comprises a water wheel type turbine blade design along with a tangential inlet 601 (top) and outlet 602 (bottom). This figure could be used as a representation of multiple inlets when coupled with the smooth disc turbine design. Inlets may be any number greater than one and positioned tangentially around the perimeter of the turbine discs.

The exemplary systems and methods of this disclosure have been described in relation to systems and methods involving a hydroelectric turbine system. However, to avoid unnecessarily obscuring the present disclosure, the preceding description omits a number of known structures and devices, and other application and embodiments. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the methods have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A fluid turbine system comprising:
   a body configured to receive an inlet fluid supply, the body having a longitudinal axis;
   at least one turbine blade in fluid communication with the inlet fluid supply;
   a turbine shaft axially mounted along the longitudinal axis and coupled to the at least one turbine blade, the turbine shaft having a hollow turbine shaft portion with at least one port, the hollow shaft portion configured to communicate a fluid; and
   an electrical generator in communication with the turbine shaft;
   wherein:
   the inlet fluid supply imparts a turbine blade torque to the at least one turbine blade and flows into the at least one port of the hollow turbine shaft portion;
   the turbine shaft receives the turbine blade torque and urges the turbine shaft to rotate along the longitudinal axis to create a rotating turbine shaft;
   the electrical generator generates electricity as enabled by the rotating turbine shaft; and
   the inlet fluid supply enters the at least one port of the hollow turbine shaft portion and flows through the hollow turbine shaft portion.

2. The system of claim 1, wherein the inlet fluid supply exits the body through the hollow turbine shaft portion.

3. The system of claim 1, wherein the inlet fluid supply is provided by a water utility water supply.

4. The system of claim 1, wherein the electrical generator is a DC generator and the electricity includes DC electricity.

5. The system of claim 1, further comprising a system controller operating to control at least one of an inlet fluid supply pressure and an inlet fluid supply flow rate.

6. The system of claim 1, wherein:
   the body comprises a body chamber configured to direct the inlet fluid supply to substantially flow tangentially along a turbine blade surface of the at least one turbine blade; and
   the at least one turbine blade is at least one turbine blade disc.

7. The system of claim 1, wherein the inlet fluid supply is a liquid and the at least one turbine blade is a plurality of turbine blades.

8. A method of using a fluid turbine device comprising:
providing the fluid turbine device comprising:
- a body configured to receive an inlet fluid supply, the body having a longitudinal axis;
- at least one turbine blade in fluid communication with the inlet fluid supply;
- a turbine shaft axially mounted along the longitudinal axis and coupled to the at least one turbine blade, the turbine shaft having at least one port and a turbine shaft interior configured to communicate a fluid; and
- an electrical generator in communication with the turbine shaft;

supplying the inlet fluid supply to the body;
directing the inlet fluid supply to flow along a turbine blade surface of the at least one turbine blade;
generating a turbine blade torque from a rotation of the at least one turbine blade;
flowing the inlet fluid supply into the at least one port and within the turbine shaft interior;
receiving, by the turbine shaft, the turbine blade torque;
rotating the turbine shaft as urged by the turbine blade torque to create a rotating turbine shaft; and
generating electricity by the electrical generator as enabled by the rotating turbine shaft.

9. The method of claim 8, wherein the inlet fluid supply is a liquid.

10. The method of claim 8, wherein the at least one turbine blade is a plurality of turbine blades.

11. The method of claim 8, wherein the inlet fluid supply is provided by a water utility water supply and the at least one turbine blade is at least one turbine blade disc.

12. The method of claim 8, wherein the electrical generator is a DC generator and the electricity includes DC electricity.

13. The method of claim 8, further comprising a system controller operating to control at least one of an inlet fluid supply pressure of the inlet fluid supply and an inlet fluid supply flow rate of the inlet fluid supply.

14. A fluid turbine device comprising:
- a body having a longitudinal axis and configured to receive an inlet fluid stream;
- at least one turbine blade positioned within the body, the at least one turbine blade configured: i) with a turbine blade surface oriented to generate a turbine blade torque as the inlet fluid stream flows over the turbine blade surface, and ii) to rotate about the longitudinal axis; and
- a hollow turbine shaft comprising at least one port and configured to communicate a fluid and to rotate about the longitudinal axis, the at least one turbine blade axially positioned about the hollow turbine shaft and rotating with a rotation of the hollow turbine shaft;

wherein:
the inlet fluid stream enters the body and flows over the turbine blade surface and into the at least one port of the hollow turbine shaft; and
the hollow turbine shaft generates a hollow turbine shaft torque upon the rotation of the hollow turbine shaft.

15. The device of claim 14, wherein the at least one port is a plurality of ports.

16. The device of claim 14, wherein the inlet fluid stream enters the at least one port and exits the body.

17. The device of claim 14, further comprising:
an electrical generator configured to receive the hollow turbine shaft torque, wherein the electrical generator generates electricity.

18. The device of claim 14, wherein the inlet fluid supply is a liquid and the at least one turbine blade is a plurality of turbine blades.

19. The device of claim 17, wherein the electrical generator is a DC generator and the electricity includes DC electricity.

20. The device of claim 14, further comprising a system controller operating to control at least one of an inlet fluid supply pressure of the inlet fluid stream and an inlet fluid supply flow rate of the inlet fluid stream.

* * * * *